United States Patent [19]

Grant

[11] 4,020,408
[45] Apr. 26, 1977

[54] PULSE WIDTH MODULATED DC-TO-DC POWER CONVERTER USING A SINGLE ENDED TRANSFORMER

[75] Inventor: Jon H. Grant, Fullerton, Calif.
[73] Assignee: Etatech, Inc., Placentia, Calif.
[22] Filed: Oct. 2, 1975
[21] Appl. No.: 618,738
[52] U.S. Cl. .................................................. 321/2
[51] Int. Cl.² ................... H02P 13/22; H02M 1/18
[58] Field of Search ............. 321/2, 4; 323/DIG. 1; 331/109, 112

[56] References Cited
UNITED STATES PATENTS

| | | | |
|---|---|---|---|
| 3,064,177 | 11/1962 | Bender | 321/2 |
| 3,069,612 | 12/1962 | Hamilton | 321/2 |
| 3,292,104 | 12/1966 | Kitchin | 331/109 |
| 3,419,781 | 12/1968 | Jullien-Davin | 321/2 |
| 3,435,320 | 3/1969 | Lee et al. | 321/2 |
| 3,697,851 | 10/1972 | Mast | 321/2 |
| 3,725,739 | 4/1973 | Griffey | 321/2 |
| 3,771,040 | 11/1963 | Fletcher et al. | 321/2 |
| 3,824,450 | 7/1974 | Johnson et al. | 321/2 |

FOREIGN PATENTS OR APPLICATIONS

| | | | |
|---|---|---|---|
| 1,030,878 | 5/1958 | Germany | 331/112 |

Primary Examiner—William H. Beha, Jr.
Attorney, Agent, or Firm—Frank C. Lowe

[57] ABSTRACT

A pulse width modulated DC-to-DC power converter wherein a single ended transformer circuit includes a single switch transistor at the input and a rectifier at the output. A control circuit to the switch transistor base is powered by a drive winding on the transformer which is shunted by the primary winding of a saturable reactor. A regenerative winding opposing, and in series with, the drive winding provides the regenerative drive necessary to support oscillation of the circuit at a frequency determined by the saturation period of the saturable reactor. A resistor between the drive winding and the saturable reactor establishes both the magnitude of the drive current and the magnetizing current of the transformer. Pulse width modulation of the DC output is attained by a single, isolated DC voltage at the secondary of the saturable reactor. Supplemental circuitry provides for regulation of the isolated DC voltage to produce a constant output voltage and for protection of the switch transistor against overloads.

15 Claims, 4 Drawing Figures

PULSE WIDTH MODULATED DC-TO-DC POWER CONVERTER USING A SINGLE ENDED TRANSFORMER

The present invention relates to DC voltage converters to convert a direct current power input at one voltage level to a direct current power output at a different voltage level, and more particularly to DC-to-DC voltage converters which function through pulse-width modulation to control the voltage of the output.

The invention has special utility in providing a low-voltage high-power DC output from a conventional, readily available 110 volt AC or 150 volt DC input. As such, the invention will find a ready market as a power converter for digital equipment of various types which require a five volt power supply of as much as 1,000 watts. Accordingly, the invention will be described with reference to this special use, although the invention does have other uses at various voltage level inputs or outputs.

The primary object of the invention is to provide a novel and improved DC-to-DC voltage converter capable of a high power output which uses an absolute minimum of driving components in a simple, yet fully controlled driving circuit to provide for an efficient, comparatively small, compact, low cost unit and avoid the complex control and drive circuitry encountered in prior art converters.

The prior art concerning DC voltage converters and regulators includes first, a series pass regulator wherein a line-frequency transformer reduces an AC input voltage, a commonly available 110 volt, 60 cycle power source, to a selected AC voltage level, say for example, five volts. This reduced AC voltage is then rectified and regulated and stabilized. The output voltage is controlled by a pass transistor in series which, in turn, is regulated by a voltage control circuit. The disadvantages of this type of regulator are a physically large unit and considerable heat losses which must be dissipated in some manner.

A much smaller regulator has been developed by using a high frequency, center tapped transformer. The input, usually from an AC source, is first rectified and the primary of the transformer is operated at the rectified line voltage by a square-wave oscillator having a pair of opposing switch transistors to produce a push-pull action at the primary. The output from the secondary of the transformer includes circuitry which converts the high frequency AC secondary voltage to a DC voltage. The output, a unipolar, square-wave voltage will be averaged by a suitable filter. The maximum voltage of the square wave, the time of the voltage pulse called the "pulse width" is compared with the wave period time and can be expressed as a volt-second product. The output voltage will, of course, be the quotient of the volt-second product and the wave period. All other factors constant, the output voltage will follow variations of the input voltage. However, a desirable mode for causing the output voltage to deviate from the input voltage is to modulate the pulse width of the square wave. An arrangement in the circuitry to vary the pulse width responsive to a voltage increase and vice versa is used to hold a constant average voltage, voltsecond output of the converter regardless of variation of the input voltage. The disadvantage of this construction resides in the fact that the components can become quite expensive, the control circuits quite complex, and the heat losses must be dissipated although they are considerably less than the heat losses of a series pass regulator.

The present invention was conceived and developed with the foregoing and other considerations in view. This invention comprises in essence:

a. a DC-to-DC power converter using a high frequency converter-type power transformer to transfer power by normal transformer means with but a single switch transistor in the primary circuit. A drive circuit to the base of this switch transistor provides an off-on sequence of voltage and current at the selected frequency and with pulse width modulation to regulate the output voltage. The drive circuit is powered through additional windings on the transformer and exploits and uses a small portion of the energy stored in the core of the transformer during off periods of the single switch transistor. The drive circuit includes and is controlled by a saturable reactor having a control winding which may be isolated from both the input and output of the converter. This control winding will be clamped to a control voltage to regulate the output voltage through establishing the time of voltage pulses in the drive circuit and effect the pulse width modulation of the same.

b. This basic arrangement of components may be supplemented by using a voltage regulator at the isolated control winding of the saturable reactor to regulate and stabilize the output voltage of the converter by switch modulation, the circuits being naturally compensating to pulse width modulation of the output voltage.

c. These basic arrangements may be further modified by protecting the switch transistor against overload, by the simple expedient of shunting the base lead of the switch transistor for a selected period whenever an overcurrent is sensed at the primary lead.

It follows that other objects of the invention are to provide a novel and improved DC-to-DC power converter which requires fewer parts, costs less, achieves higher packaging density and is more efficient and reliable than the present circuits used to perform the power conversion function.

Another object of the invention is to provide a novel and improved DC-to-DC power converter which uses a control voltage which may be isolated from both the input and the output and provides a degree of flexibility that is not found in other circuits of this type without the inclusion of other complicated circuitry.

Another object of the invention is to provide a novel and improved DC-to-DC power converter which uses the inductive effect of the transformer core to drive a simplified, low-power, easily-compensated drive circuit for operation of the unit during the switch transistor off-time.

With the foregoing and other objects in view, my invention comprises constructions, combinations and arrangements of circuits, parts and components as hereinafter described, defined in the appended claims and illustrated diagrammatically in the accompanying drawings in which:

Figure 1:
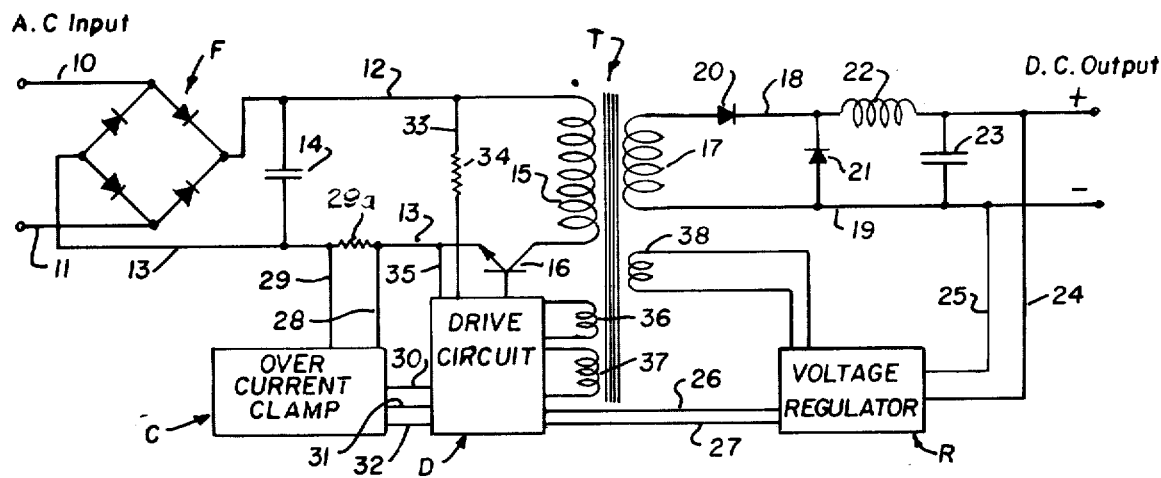
FIG. 1 is a diagram, partially in block form and partially in circuit detail, of a DC-to-DC converter arranged with a drive circuit according to the present invention which may be used with a common AC input, and which may include a voltage regulator between the output and the drive circuit, and an overcurrent clamp between the input lead and the drive circuit.

Referring more particularly to the drawing, the circuit shown partially in block form at FIG. 1 illustrates an arrangement incorporating the present invention which is especially useful for converting a readily available 110 volt AC input to a controlled 5 volt DC output which can be used for digital equipment. The AC input terminals 10 and 11 connect with a full-wave rectifier F to produce a DC input of comparable voltage in a positive primary lead 12 and a negative primary lead 13, the voltage ripple being attenuated by a filter capacitor 14. The primary leads 12 and 13 connect with the primary winding 15 of transformer T as the primary circuit loop. An NPN switch transistor 16 in the lead 13 is turned on and off by an intermittent current into its base, supplied from a drive circuit D, at a selected frequency such as 40 KHZ, as hereinafter further described. The transformer characteristics, combined with the on-off action of the switch transistor 16, are such that the current therethrough forms, essentially, a square wave which, through normal transformer action, is converted to a selected square wave voltage at the secondary winding 17 of the transformer T. The output leads 18 and 19 from the secondary coil 17 include a rectifier diode 20. The output leads 18 and 19 include also a "catch" diode 21 across the leads and an output filter consisting of an inductor 22 and capacitor 23.

This output will be a clipped square wave varying between approximately 0 volts and a positive voltage somewhat higher than the desired 5-volt steady output V, as established by the windings 15 and 17 of transformer T. This higher transformer voltage, when averaged out by the output filter, will give the selected output voltage. The average output voltage will depend upon the transformer voltage and the pulse width of the square wave, a volt-second product. Hence, modulation of the pulse width can be used to vary the output voltage with respect to the input voltage and, more importantly, modulation of the pulse width can be used to hold the output voltage constant regardless of fluctuations of the input voltage. In the FIG. 1 arrangement, this desirable control is accomplished by a voltage regulator R having sensing leads 24 and 25 extending from the output leads 18 and 19 to the regulator R and control voltage leads 26 and 27 extending from the regulator R to the drive circuit D, as hereinafter further described.

The use of a converter circuit according to FIG. 1 is rendered possible by the availability of a high voltage, high current switch transistor 16. To maintain proper operation of this component during turn on and overload conditions, it is expedient to provide an overcurrent clamp C to protect the transistor 16. An overcurrent is sensed by a pair of leads 28 and 29 in the primary lead 13, with a small resistance 29a between the leads 28 and 29 to impress a voltage drop between these leads 28 and 29, depending upon the load current through the primary. Other leads 30, 31 and 32 connect the clamp C with the drive circuit. At the threshold of an excess current flow through the primary, the clamp shunts the base lead from the drive circuit to the switch transistor 16 to prevent current flow through the transistor, as hereinafter described.

A starter lead 33 extends from the primary lead 12 to the drive circuit D which includes a high resistance resistor 34 such that the flow of current through the starter circuit is insignificant when the unit is in operation. To complete the circuits of FIG. 1, a connector lead 35 extends from the drive circuit to the primary lead 13. Windings 36 and 37 at the transformer T connect with the drive circuit and a winding 38 at the transformer T connects with the voltage regulator, all as hereinafter further described.

Figure 2:
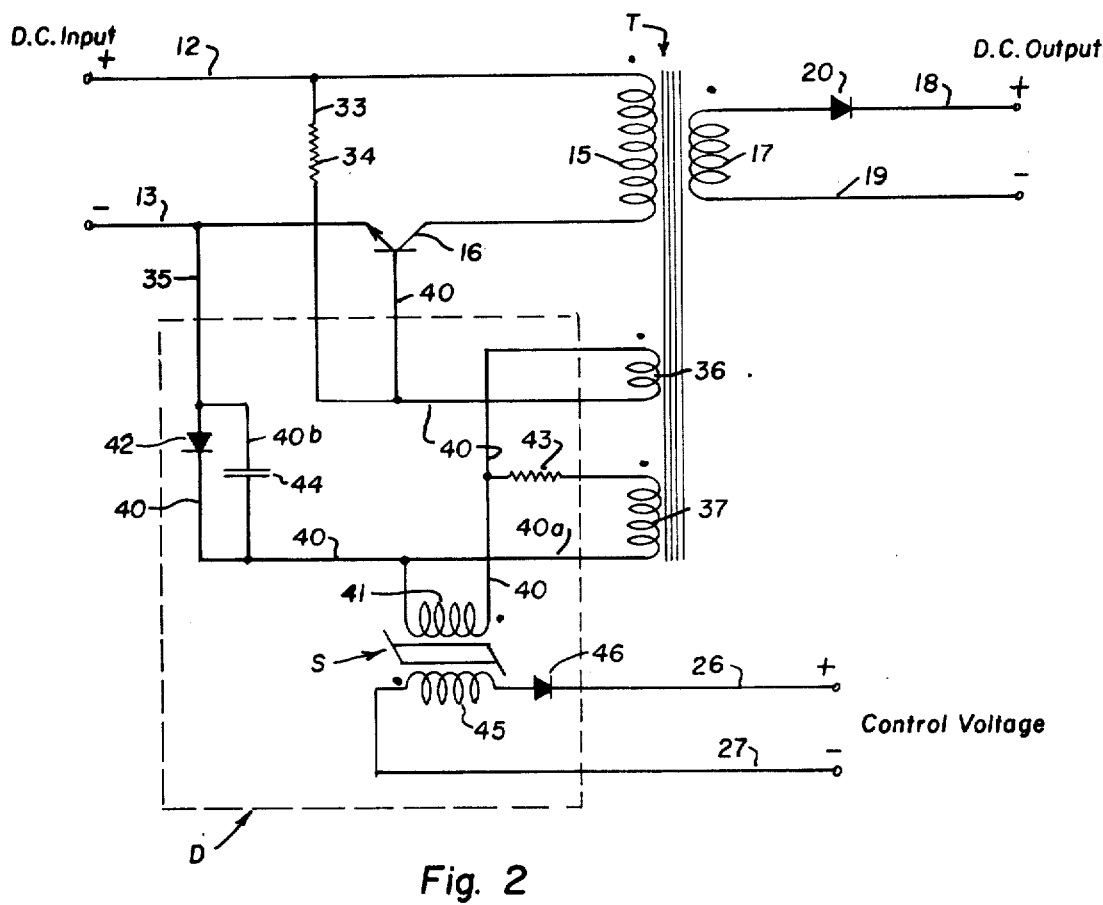
FIG. 2 is a circuit diagram similar to FIG. 1 but simplified to show in detail the essential arrangement of the drive circuit indicated at FIG. 1 for a DC-to-DC converter according to the present invention, but without the voltage regulator and overcurrent clamp controls.

FIG. 2 illustrates the basic circuit of a DC-to-DC converter constructed according to the invention without the voltage regulator R and the overcurrent clamp C. Positive and negative leads 12 and 13, carrying the DC input voltage, connect with the primary winding 15 of transformer T. The switch transistor 16 is in lead 13 as hereinbefore stated. The output leads 18 and 19 from the secondary winding 17 of the transformer T include the rectifier diode 20. While this output voltage may be averaged by a filter as heretofore described, it can be used directly in some applications, as for example, with a heating resistor. The drive circuit D operates the switch transistor 16 at a selected frequency and the timing of the on and off cycles to establish the pulse width of the square-wave output. This timing is determined by a control voltage at leads 26 and 27 which may be supplied from any suitable source such as the voltage regulator R, hereinafter described.

The drive circuit D includes a base lead 40 which extends from the base of transistor 16 through the first winding 36 associated with the transformer T, thence to the primary winding 41 of a saturable reactor S, thence to a blocking rectifier diode 42 and thence to the negative primary lead 13 by the connective lead 35 heretofore mentioned. A lead 40a shunts the saturable reactor winding 41 and this lead 40a includes the winding 37 associated with transformer T and a resistor 43. It is to be noted that winding 37 has considerably more turns than winding 36, that it opposes winding 36 and in doing so can overwhelm the effect of winding 36 when the windings act against each other. A lead 40b shunts the blocking rectifier 42 and includes a bypass capacitor 44.

The saturable reactor S includes a secondary winding 45 which connects with the regulator voltage leads 26 and 27, and a rectifier 46 in the lead 26 is reversed biased with respect to the control voltage at leads 26 and 27. To complete the drive circuit D, the starting lead 33 connects with the base lead 40 adjacent to the switch transistor 16. The leads 26 and 27 will be connected to a control voltage as produced by a regulator R, as hereinafter described.

Operation of this drive circuit is initiated through the starting lead 33. Initially, the switch transistor 16 is off and no output voltage exists in the output leads 18 and 19. A small starting current, restricted by resistor 34, flows through the lead 33 and through leads 40, 40a and 40b to charge the bypass capacitor 44 and at the same time, turn on the switch transistor 16 when threshold voltage is reached at the base lead 40. Conduction commences through the primary leads 12 and 13 when the transistor 16 is turned on causing a voltage to be developed across the primary winding 15 in the positive sense with respect to the positive voltage of lead 12, as indicated by the dot at one end of the winding, FIG. 2. By means of normal transformer action, a voltage is induced in the secondary winding 17 and in windings 36 and 37 of this transformer T.

The voltage induced in windings 36 and 37 of transformer T is such as to sustain the turn-on current at the base of switch transistor 16 by the blocking rectifier 42 and its bypass capacitor 44. The positive voltage effect of winding 37 extends through resistor 43 and overwhelms the opposite voltage effect of winding 36. Rapid saturation of the switch transistor 16 is such that essentially all of the input source voltage through leads 12 and 13 is impressed across the primary winding 15 of transformer T. By normal transformer action the voltage developed across the secondary winding 17 is dictated by the turns ratio of the transformer and this voltage will be extended to the output terminals of leads 18 and 19 through the forward biased rectifier 20.

The voltage induced in winding 37 of the transformer T also impresses a voltage across winding 41 of the saturable reactor S which is positive at the terminal indicated by the dot at one end of the winding, FIG. 2. The magnitude of this voltage is equal to the sum of the voltages across winding 36 of transformer T, the base emitter junction of switch transistor 16 and the voltage across capacitor 44. By normal transformer action a voltage is induced in the secondary winding 45 of the saturable reactor S. However, this induced voltage is disconnected from the control voltage, at the terminals of leads 26 and 27, by the reverse biased rectifier 46.

After a period of time determined by the core area, saturation flux density and number of turns of winding 41 of the saturable reactor S, this reactor saturates. The saturable reactor is of a type selected for having a square loop characteristic. Thus, the magnetizing current of winding 41 increases rapidly as the core saturates. At this point, the drive current from the winding 37 of transformer T and through the resistor 43 is rapidly shunted from the base of switch transistor 16 and through winding 41 of the saturable reactor S. The switch transistor 16 is then turned off by means of the reverse bias provided by winding 36 of the transformer which is no longer overwhelmed by the greater voltage of winding 37.

By normal inductive action, the magnetizing energy stored in the core of transformer T during the on-time of switch transistor 16 causes a reverse current to flow into the winding 37 of transformer T. However, a comparable current flow through the primary and secondary windings 15 and 17, and the winding 36 of said transformer is blocked from conduction by the now off switch transistor 16, the reversed biased base emitter junction of this switch transistor 16 and the reversed biased output rectifier 20. The now reversed flow of the magnetizing current into the winding 37 of the transformer T through resistor 43 and through the winding 41 of the saturable reactor S causes negative voltage across the winding 41 of the saturable reactor S at the terminal indicated by the dot at an end of the winding, FIG. 2, and a negative voltage is impressed across the secondary winding 45 by normal transformer action. However, the positive voltage effect at the opposite end of the secondary winding 45 is clamped by the control voltage at the terminals of leads 26 and 27 as above mentioned. In this connection, it is to be noted that the greater the control voltage, the shorter the off-cycle period of the reactor, and switch 16, and accordingly, the system is easy to stabilize with a voltage regulator associated with the output leads 18 and 19 as hereinafter described.

The requirement for magnetic equilibrium of transformer T, that is, $\int V \, dt = 0$, in conjunction with the value of resistor 43 establishes the magnitude of the aforementioned reverse magnetizing current into winding 37 of transformer T such that the value of the current acting upon resistor 43 in series with the voltage across winding 41 of reactor S during the off period of switch transistor 16 creates a volt-second product, at winding 37, equal and opposite to that impressed across the winding by normal transformer action during the power transfer cycle when transistor 16 is on.

The off-cycle terminates when the saturable reactor S saturates and the magnitude of the negative voltage across winding 41 drops below the point where the sum of its voltage and the voltage across winding 36 of the transformer T1, being of the correct polarity at this portion of the cycle, is sufficient to overcome the sum of the voltage effects of the bypass capacitor 44 to impress a threshold voltage on the base lead 40 of the switch transistor 16. The switch transistor 16 turns on again to commence the cyclic sequence.

Various types of voltage regulators may be used with the circuit described at FIG. 2. For example, the regulator may be a simple battery having a constant voltage output. However, the preferred unit will be a regulator which provides for a constant output voltage regardless of fluctuations which may occur across the input leads of the DC-to-DC converter. Such a voltage regulator R may be arranged as indicated at FIG. 1. The regulator will sense the output voltage of the converter through leads 24 and 25 and connect with the saturable reactor secondary winding 45 through leads 26 and 27. Power to operate the regulator may be obtained from a winding 38 at the transformer T.

Figure 3:
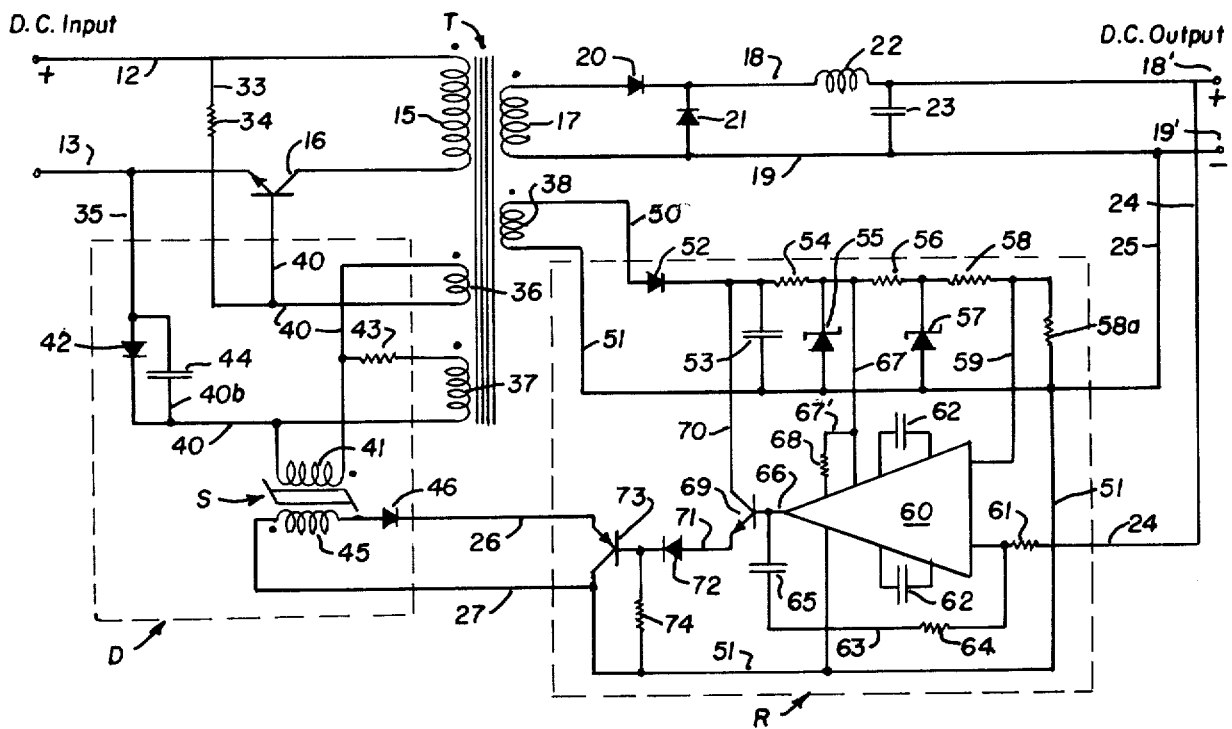
FIG. 3 is a circuit diagram of the basic DC-to-DC converter shown at FIG. 2 combined with a voltage regulator.

One arrangement of the circuits of such a regulator is illustrated in FIG. 3. Assuming that the desired output voltage at the output terminals 18' and 19' is 5.25 volts DC for use with a computer (although any other voltage could be selected), the winding 38 will be such that the on period voltage across the leads 50 and 51 from the winding 38 will be somewhat greater than 5.25 volts. Lead 51 is the ground lead and is connected to ground lead 19 of the output. A rectifier 52 in lead 50 provides for a direct current in the leads 50 and 51 while a capacitor 53 shunting the leads 50 and 51 stores energy for use during the off time of the switch transistor 16, operating transformer T, when the reverse bias of rectifier 52 prevents a reverse current in the leads.

A resistor 54 in lead 50 provides bias current for a voltage regulator zener diode 55 shunting leads 50 and 51. A second resistor 56 in lead 50 provides a further bias current for a temperature compensated reference zener diode 57 shunting leads 50 and 51 such that the voltage at these leads 50 and 51 is steady and somewhat higher than the desired 5.25 volts. Voltage divider resistors 58 and 58a shunt the leads 50 and 51 with a reference lead 59 between the resistors having the desired reference voltage of 5.25 volts above the ground lead 51. This reference lead 59 extends to the non-inverting input of an operational amplifier 60. This operational amplifier 60 is a conventional unit such as furnished by RCA Corporation, Catalog No. CA 3010A. The lead 24, from the high output lead 18 of the voltage converter, extends to the inverting input of operational amplifier, this input lead containing a summing resistor 61. Phase compensation in the amplifier 60 is effected by capacitors 62 connecting into the compensation terminals thereof. A lead 63, having a resistor 64 and a capacitor 65, extends from the input lead 24 to the output lead 66 of the operational amplifier to control, in conjunction with resistor 61, the high frequency loop gain to assure adequate loop damping at the desired closed loop bandwidth of the total power control loop.

The amplifier is powered by the voltage of lead 67 connecting with lead 50 adjacent to the connection of the zener diode 55. The lead 67 bifurcates at the operational amplifier with a resistor 68 in the branch lead 67' to provide a bias current for the input stage current source of the operational amplifier 60.

The voltage at the output of the operational amplifier is set at a selected point such that the voltage will be at the normal level of the voltage required to clamp leads 26 and 27 of the saturable reactor S under normal input and load conditions, and this voltage will fluctuate several volts above and below this base voltage to compensate for fluctuations of voltage at the output leads 18 and 19. The output lead 66 of the operational amplifier 60 connects with the base of an NPN emitter-follower transistor 69 having its collector connecting, through lead 70, to the voltage source at lead 50 to provide for a current gain at the output of this transistor. The output of this transistor 69 extends by lead 71 through a rectifier diode 72 which, in turn, connects with the base of a PNP type emitter follower transistor 73 whose collector connects with lead 26 and whose emitter connects with lead 27 of the saturable reactor S. The output circuits are completed by a resistor 74 between leads 51 and lead 71 to provide bias current for the level shifting and buffering between the output terminal of the operational amplifier 60 and the lead 26 as described.

It will be apparent to those skilled in the art that the DC-to-DC converter circuit, as shown in FIGS. 1 and 2, can be modified by the addition of resistors, capacitors and rectifiers at selected locations, not herein shown, as for example, across the windings of said transformer and said resistors 43. Such supplementary components may be necessary to protect switch transistor 16 and establish the magnetizing current of winding 37, as well as to further shape the voltage waveform across the windings of said transformer T during the off time of switch transistor 16. Such modifications are not shown since the same can be easily made by a skilled technician when placing the unit in operation.

The overcurrent clamp C will function to sense an excess current, an overload, in the primary leads 12 and 13 whenever the switch transistor 16 is on and the overload is occurring. The clamp C will turn switch transistor 16 off by bypassing the base 40 of that transistor. Thereafter, after a selected time interval, not necessarily associated with the frequency of the drive circuit D, the switch 16 again turns on to resume operation of the unit. The circuit of the primary leads will again conduct and the overcurrent clamp will again function in repeated cycles until the overload is removed.

Figure 4:
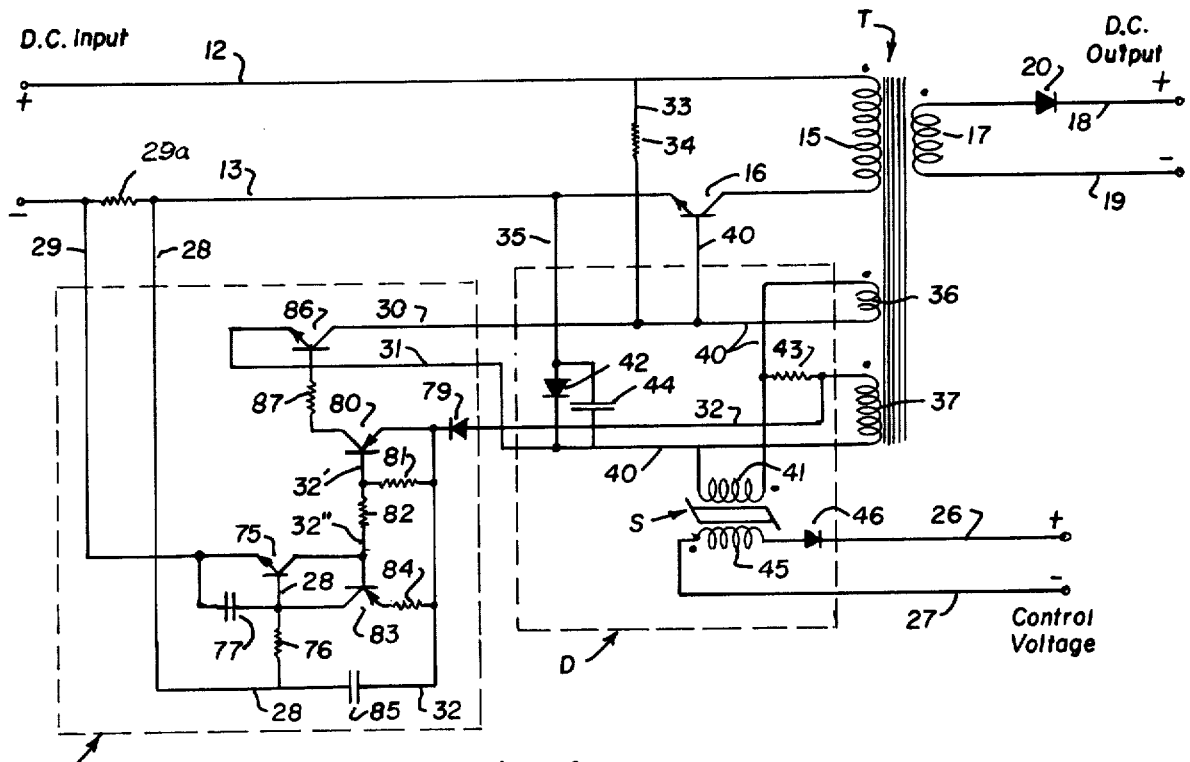
FIG. 4 is a circuit diagram of the basic DC-to-DC converter to control the output of the converter shown at FIG. 2, combined with an overcurrent sense clamp to open the main circuit whenever an excess current flow occurs.

The circuit diagram shown at FIG. 4 is one possible arrangement of an overcurrent clamp. This clamp includes leads 28 and 29 extending from the negative input lead with a small resistance 29a being between the leads 28 and 29, on negative input lead 13. Accordingly, there will be a voltage drop between these leads whenever current is flowing through the input leads 12 and 13 with switch transistor 16 being on. When the current in lead 13 exceeds a selected value. an incipient overload, the voltage drop across resistor 29a will then actuate the clamp.

The basic loop, to sense this overload, includes an NPN transistor 75. The lead 28 extends, through a resistor 76, to the base of the transistor, and the loop is completed by lead 29 extended from the emitter thereof. A capacitor 77 shunts the leads 28 and 29 to prevent the circuit from being triggered by high speed transients across the sense resistor 29a or in the leads 28 and 29.

The lead 32, heretofore mentioned, extends from the positive side of winding 37 (positive when switch transistor 16 is on) in the drive circuit D to the clamp circuit C with a rectifier 79 therein to prevent current reversals. One branch of this lead 32 extends to the emitter of a turn-on PNP transistor 80. Another branch of lead 32 includes a resistor 81 and thence bifurcates with one leg 32' extending to the base of transistor 80. The other leg 32" includes resistor 82 and thence bifurcates. One leg extends to the base of a latch transistor 83 and the other leg extends to the collector of transistor 75. Another branch of the lead 32 extends, through resistor 84, to the emitter of latch transistor 83 while yet another branch of lead 32 extends to a capacitor 85 which connects with lead 28.

To complete this circuitry, a lead 30, heretofore mentioned, extends from the base lead 40 of switch transistor 16 in the drive circuit to the collector of a grounding NPN transistor 86 in the overcurrent clamp C. A lead 31, heretofore mentioned, extends from connector lead 40 in the drive adjacent to diode 42 and circuit to the emitter of the clamp transistor 86. The base of the clamp transistor 86 connects with the collector of transistor 80 with a resistor 87 in the connective lead.

Operation of the overcurrent clamp is initiated when the voltage differential on leads 28 and 29 is sufficient to produce a forward bias on transistor 75 to permit current to flow through lead 32" with a voltage drop on the bases of transistors 80 and 83 turning these transistors on. The resistance 82 provides a turn-on drive to transistor 80 when transistor 75 turns on. The current through latching transistor 83, in conjunction with resistor 76, latches the transistor 75 on. At the same time, the current through the turn-on transistor 80 imposes a voltage at clamp transistor 86, through resistor 87, to turn that transistor on and turn off switch transistor 16. Resistor 81 prevents turn-on of transistor 80, and transistor 86, before the collector of transistor 75 has dropped far enough in voltage to guarantee positive feedback and latching by transistor 83.

The clamp cycle time is determined by the value of capacitor 85 and the values of resistors 81, 82, 84 and 87 which determine the rate of discharge of capacitor 85. Once the capacitor is discharged, the voltage at the base of transistor 75 drops, turning off transistor 75. Without current in lead 32" because transistor 75 is off, transistors 80 and 86 turn off permitting the now forwardly directed current of winding 36 to turn on the switch transistor 16 to initiate regular operation of the unit. If the overload continues, this clamp will again operate to turn off transistor 16. Otherwise, normal operation of the unit will proceed.

The DC-to-DC converter circuit of FIG. 1, including the voltage regulator circuit R of FIG. 3 as well as the overcurrent sense clamp circuit C of FIG. 4, has been constructed using the component values and types listed in Tables I and II. The circuit operates at a nominal frequency of 40 KHZ and delivers 20 amps of load current at an output voltage of 5.25 volts DC with an efficiency of 78% at the nominal input voltage of 115 AC volts. Line regulation for an input voltage change of plus or minus 16% is better than plus or minus 0.1% while load regulation for a 1 amp to 20 amp load change is better than 0.1%. Transient response for a 10 amp step load change is less than 0.25 volts with a recovery time to plus 0.05% within 250 micro-seconds while output ripple and noise is less than 0.1 volts peak to peak.

TABLE I

| Reference | Component | Make | Value |
|---|---|---|---|
| 34, 64 | Resistor | | 220 k |
| 43 | " | | 22 ohms |
| 29a | " | | 0.27 ohms |
| 87 | " | | 75 ohms |
| 81 | " | | 100 ohms |
| 56, 82 | " | | 470 ohms |
| 84 | " | | 4.7 k |
| 76 | " | | 1 k |
| 74 | " | | 330 ohms |
| 54 | " | | 220 ohms |
| 68 | " | | 15 k |
| 58 | " | | 2.7 k |
| 58a | " | | 150 k |
| 61 | " | | 2.2 k |
| 44 | Capacitor | | 100 mf |
| 23 | " | | 10,000 mf |
| 77, 62 | " | | 220 pf |
| 85, 53 | " | | 1 mf |
| 65 | " | | 4700 pf |
| 16 | Transistor | Motorola | 2N6308 |
| 86 | " | | 2N3724 A |
| 80, 83, 73 | " | | 2N2907 A |
| 75, 69 | " | | 2N2219 A |
| 42, 46, 79, 52 | Diode | | 1N4933 |
| 20, 21 | " | TRW | SD41 |
| 72 | " | | 1N4004 |
| 55 | Zener Diode | | 1N758 A |
| 57 | Temp. Comp. Zener Diode | | 1N823 A |
| 60 | Operational Amplifier | | CA 3010 A |
| 22 | Inductor | | 40 uH |

TABLE II

| Ref. | Component | | Make | Value |
|---|---|---|---|---|
| T | Transformer Core: Ferroxcube | | | 783E608-3C8 |
| | Winding Data: | Winding 15 | | 124 turns No. 22 |
| | | Winding 17 | | 10 turns 4 each No. 18 |
| | | Winding 36 | | 2 turns No. 26 |
| | | Winding 37 | | 9 turns No. 26 |
| | | Winding 38 | | 15 turns No. 26 |
| S | Transformer Core: Ferroxcube | | | 1041CT060-3E2A |
| | Winding Data | Winding 11 | | 22 turns No. 30 |
| | | Winding 12 | | 32 turns No. 30 |

Thus, a novel, useful DC converter circuit has been described utilizing the stored energy of a single ended power transformer and a single switch transistor in conjunction with a control winding on a saturable reactor to provide control of the power transfer function by means of a single isolated DC control voltage. The circuit minimizes or eliminates the problems provided by prior art circuits of this type.

I have now described in detail a preferred arrangement embodiment of my invention; however, it is apparent that others skilled in the art can build and devise alternate and equivalent constructions which are within the spirit and scope of my invention. Hence, I desire my protection to be limited not by the constructions illustrated and described, but only by the proper scope of the appended claims.

What is claimed is:

1. In a DC-to-DC voltage converter having a single-ended transformer having a primary winding with intput leads extending from this primary winding to a DC power source and a secondary winding with output leads extending from this secondary winding to a DC output; a switching transistor in an input lead to switch the transformer on and off responsive to voltage changes at the base of the transistor; a rectifier means in an output lead to restrict the output of a DC voltage and a drive circuit connecting with the base of the switching transistor to produce a cyclic voltage at the transistor base whereby a positive square wave is obtained at the DC output, the improvement comprising:
   a. a drive winding at the transformer to initiate voltages in opposite directions as the transformer turns on and off responsive to energy stored in the transformer core;
   b. a regenerative winding at the transformer in the drive circuit lead between the aforementioned drive winding and the switching transistor base opposing the drive winding and having fewer turns than the drive winding whereby, when the transistor is "on" the voltage generated by the drive winding overwhelms the voltage generated by the regenerative winding to provide the "on" voltage at the switching transistor base; and
   c. a control means including a shunt lead which shunts the drive winding, adapted to actuate in a cyclic manner to first close the shunt lead to drop the drive winding voltage to permit the voltage induced in the regenerative winding to turn "off" the switching transistor and thereafter open the shunt lead to turn "on" the switching transistor, producing the aforementioned positive square wave output.

2. A DC-to-DC converter including:
   a. a single ended transformer having a primary winding with input leads extending from this primary winding to a DC power source and a secondary winding with output leads extending from this secondary winding to a DC output;
   b. a switching transistor in an input lead to switch the transformer on and off responsive to voltage changes at the base of the transistor;
   c. a rectifier means in an output lead to restrict the output to a DC voltage; and
   d. a drive circuit connecting with the base of the switching transistor, including:
      a drive winding at the transformer to initiate voltages in opposite directions as the transformer turns on and off responsive to energy stored in the transformer core;
   e. a regenerative winding at the transformer in the drive circuit lead between the aforementioned drive winding and the switching transistor base opposing the drive winding and having fewer turns than the drive winding whereby, when the transistor is "on" the voltage generated by the drive winding overwhelms the voltage generated by the regenerative winding to provide the "on" voltage at the switching transistor base; and f. a saturable reactor whose primary winding shunts the drive winding to drop the primary winding voltage when the saturable reactor saturates, to then permit the voltage induced in the regenerative winding to turn "off" the switching transistor and thereafter turn "on" the switching transistor after the inductive energy in the transformer reverses and the saturable reactor saturates to shunt the voltage induced in the drive winding.

3. In the organization defined in claim 1, including:
a resistor in the loop formed by the drive winding and the saturable reactor to establish the magnitude of the turn on current of the drive circuit.

4. In the organization defined in claim 3, wherein:
the drive circuit includes a blocking lead connecting with an input lead;
a blocking rectifier therein; and
a capacitor shunting the blocking rectifier to prevent current flow therethrough, but permit a voltage buildup in the said drive circuit.

5. In the organization defined in claim 4, including:
a starting lead, including a resistor, extending from that input lead opposite the aforementioned input lead and connecting with the base of the switching transistor.

6. In the organization defined in claim 1, wherein:
the saturable reactor includes a secondary winding;
a control voltage across the leads from this secondary winding; and
a rectifier in a lead thereof whereby the reactor will be clamped during the switch transistor off period to establish the time at which the saturable reactor will saturate.

7. In the organization set forth in claim 6, wherein:
the output leads include an output filter and catch diode means to produce, at the output terminals, an essentially level DC voltage; and
a voltage regulator means associated with the aforesaid output leads to compensatively modify the voltage at the secondary of the saturable reactor to thereby compensatively modulate the pulse width produced by the drive circuit means and maintain a constant output voltage at the output leads regardless of fluctuations of the input voltage at the input leads.

8. The organization defined in claim 4, wherein:
the voltage regulator means includes a circuit loop from the output to an operational amplifier; and
a second loop from a winding at the transformer to produce a selected constant voltage, said voltage of the second loop connecting with the non-inverting input of the operational amplifier and the corresponding other lead connecting with the inverting input thereof.

9. In the organization set forth in claim 2, including:
an overload clamp means associated with the switching transistor; and
a current sensing means at an input lead adapted to turn off the switching transistor whenever the current in the input lead exceeds a selected predetermined value.

10. In the organization defined in claim 9, wherein:
the current sensing means includes a pair of leads connecting with an input lead at spaced apart points with a small resistance between the points;
a trigger circuit adapted to actuate whenever the voltage drop between said leads exceeds a selected value; and
a bypass circuit connecting with the base of the transistor and including a cutoff transistor therein associated with the trigger circuit.

11. A duty cycle modulated power converter circuit for use in a closed loop power conversion system, said circuit comprising:

a. a single ended power transformer, the primary winding thereof connecting with input terminals from a DC power source, and the secondary winding thereof connecting with output load terminals;

b. a blocking rectifier in said output terminals to restrict the same to a DC polarity;

c. a switch transistor in said input terminals to connect and disconnect said transformer to and from the power source;

d. turn-on means connecting the input power source to the base of said switch transistor to initiate a turn-on current to the transistor including a blocking rectifier to restrict the flow of said turn-on current to the base-emitter junction of said switch transistor and a bypass capacitor across the blocking rectifier to smooth the voltage across the blocking rectifier as the switch transistor is switching;

e. a drive winding on said power transformer including a lead connecting with the base of said switch transistor to couple power from the input power source to the base of the switch transistor when the switch transistor is on;

f. a switch winding on said power transformer in series, with the said drive winding in the drive lead thereof having a polarity opposing the drive winding and with a lesser voltage being induced therein than in the drive winding;

g. a resistor in said drive lead between the drive winding and the switch winding to establish in conjunction with the switch winding, the magnitude of drive current from the drive winding;

h. a saturable reactor shunting the drive winding and resistor, whereby upon saturation of the saturable reactor the voltage of the drive winding will drop permitting the switch winding to drop the voltage at the base said transistor turn the same off and thereafter using the magnetizing energy then stored in the power transformer to reverse the action to again turn the switch transistor on as the saturable reactor saturates in the opposite direction;

i. a control voltage means; and j. a control winding on said saturable reactor including leads to connect with said control voltage means including a blocking rectifier therein directed to disconnect by reverse bias said saturable reactor control winding during the "on" period of said switch transistor.

12. The circuit defined in claim 11, including:
a clamping means associated with said switch transistor and adapted to bypass the voltage at the base of the transistor and terminate the "on" cycle of the switch transistor responsive to an excess current through the transformer.

13. The circuit defined in claim 12, wherein the clamping means includes:

a lead from the base of the switch transistor to the junction of said driving winding and said bypass capacitor.

14. The circuit defined in claim 11, including:
filter means across said output leads to produce an essentially DC voltage at the output terminals of said leads.

15. The circuit defined in claim 14, wherein said control voltage means comprises:
a compensatively oriented voltage regulator means connecting with said output terminals and with said control winding of the saturable reactor whereby to maintain a constant voltage output regardless of fluctuations of the input voltage.

* * * * *